United States Patent [19]

Lunde

[11] 4,376,128

[45] Mar. 8, 1983

[54] PROCESS FOR IMPROVING THE COMESTIBILITY OF LEGUMES AND FOR DEFLATULATING THEM BY USE OF NEUTRAL ENZYME SYSTEMS

[76] Inventor: Kenneth E. Lunde, 1101 Noel Dr., #4, Menlo Park, Calif. 94025

[21] Appl. No.: 227,602

[22] Filed: Jan. 23, 1981

[51] Int. Cl.³ .......................... A23L 1/20; C07G 17/00
[52] U.S. Cl. ........................................ 426/46; 426/52; 435/267
[58] Field of Search ...................... 426/44, 46, 52, 53, 426/634; 435/267, 274

[56] References Cited

U.S. PATENT DOCUMENTS

| | | | |
|---|---|---|---|
| 3,293,143 | 12/1966 | Heinicke | 435/219 |
| 3,632,346 | 1/1972 | Sherba | 426/44 |
| 3,817,834 | 6/1974 | Wilson | 435/816 |
| 3,876,807 | 4/1975 | Wagner et al. | 426/634 |

OTHER PUBLICATIONS

Perlmann, G. E. & Lorand, Laszlo, "Proteolytic Enzymes", Methods in Enzymology, vol. XIX, ©1970, pp. 226–244 & 283 & 284.

Sugimoto, H. & Van Buren, J. P., *Journal of Food Science*, vol. 35, 1970, pp. 655–660.

Viebel, S., *The Enzymes*, Sumner & Myrbuck Eds., 1st Ed., vol. 1, New York, Academic Press, 1951, pp. 621–623.

*Primary Examiner*—Raymond N. Jones
*Assistant Examiner*—Elizabeth J. Curtin
*Attorney, Agent, or Firm*—Burns, Doane, Swecker & Mathis

[57] ABSTRACT

Legumes of the genus Phaseolus, genus Soja, and genus Lens are deflatulated and the consistency and comestibility of edibles containing these legumes are improved by adding to the legumes prior to cooking an effective amount of an enzyme system found in components of plants of pineapple and papaya, said enzyme system being in a neutral enzyme state. In a preferred embodiment, the enzyme addition is made to legumes of the genus Phaseolus alone or in mixture with legumes of the genus Soja.

19 Claims, No Drawings

PROCESS FOR IMPROVING THE COMESTIBILITY OF LEGUMES AND FOR DEFLATULATING THEM BY USE OF NEUTRAL ENZYME SYSTEMS

FIELD OF THE INVENTION

The present invention provides a means whereby the comestibility and consistency of edibles containing legumes is improved and the legumes' flatulence-producing factors are rendered innocuous. More particularly, in one aspect, the present invention provides a process which comprises treating legumes prior to cooking with neutralized components of the pineapple and papaya plants, or neutralized products isolated from them, in an amount necessary to increase the legumes' comestibility and consistency and minimize or eliminate their flatus-causing factors. In a further aspect, this invention provides treated bean products which comprises beans prepared in their usual manners for human and animal consumption in admixture with neutralized papaya or pineapple plant components.

REFERENCE TO RELATED APPLICATIONS

This application is related to my U.S. patent application Ser. No. 06/227,599, filed of even date herewith. This other application concerns the addition of enzyme systems, without neutralization, to legumes to deflatulate them.

BACKGROUND OF THE INVENTION

Legumes are an important foodstuff and are likely to become more so in the future. Those in some of the legume genuses, such as Phaseolus and Soja, are high in protein and provide an inexpensive alternative to animal protein, for the most part lacking only in methionine to provide a balanced diet.

Unfortunately, ingestion of some of the most nutritious and abundant legume genuses can be accompanied by severe flatulence and associated abdominal distress. The effect on individuals varies widely, but with some people it is sufficiently severe that they avoid consumption of these foods entirely.

Quantitative research on the gas-producing properties of legumes commenced in about 1948. Subsequent research has involved work with many of the species in the genuses having the greatest gas-forming tendencies. In general, this work has been aimed at identifying those components of the seed that are responsible for flatulence. One of the significant investigations in this direction was reported by Steggerda, et al., in *Soc. for Exper. Biol. and Med.*, 121, 1966, pp. 1235-9, who separated soybeans into various fractions and determined the flatus production in man with each of these fractions. They found that soybean hulls, fat, water-insoluble polysaccharides, and protein are not associated with flatulence production to any significant degree, and that the flatus-producing factor in soybeans was concentrated primarily in the low molecular weight carbohydrate fraction soluble in water. Research on other legume genuses pointed in the same direction. Compounds specifically identified as being a cause of flatus production are the alpha oligosaccharides, stachyose, raffinose, and verbascose.

The generally accepted explanation of the action of the alpha oligosaccharides in producing flatus is that the enzyme alpha galactosidase is not present in the intestinal tract of mammals. Thus, these compounds are not hydrolyzed and dissolved in the digestive tract so that they can be absorbed. Instead they reach the lower intestine essentially intact. Here anaerobic bacteria ferment these sugars with the resultant production of carbon dioxide and hydrogen, as well as some methane. Thus, these sugars are not only a source of discomfort but constitute a significant loss in nutritional value, since they amount to on the order of 4 percent of the total weight (dry basis) of white beans and 6 percent of soybeans.

Rackis in *ACS Symposium* Series 15, Sept. 11-12, 1974, pp. 207-221, reported an interesting experiment in which anaerobic cultures isolated from dog colon biopsies were used to treat a group of monosaccharides (glucose, maltose, fructose, galactose) and a group of oligosaccharides (sucrose, raffinose, and stachyose). It was found that the gas produced by all of these compounds (primarily carbon dioxide and hydrogen) was of essentially the same magnitude. Thus, any of these compounds reaching the lower intestine would result in gas formation. However, it is known that ingestion of either the monosaccharides or sucrose in normal quantities does not result in flatus. The significance of these results is that flatus production in the lower intestine may in part be related to solubility. The chemical structure of sucrose as a disaccharide is more similar to that of raffinose and stachyose than it is to the monosaccharides. Yet sucrose and the monosaccharides are highly soluble in water, whereas raffinose and stachyose have a much more limited solubility. High molecular weight polysaccharides, on the other hand, are so nearly insoluble that they may not be susceptible to anaerobic fermentation during the time of passage through the colon.

Having established that the alpha oligosaccharides present in legumes were responsible for flatulence and that the monosaccharide products of their hydrolysis did not cause flatulence, the solution to the problem would seemingly be simple. Various methods of hydrolyzing oligosaccharides have been known for many years. Perhaps the first patent on the subject was issued to Gollmert in 1906 (German Pat. No. 195,972). Gollmert used emulsin and similarly acting enzymes such as kefir lactose. Numerous other enzymes such as invertase, lactose, raffinase, and manninotriase have been reported in the technical literature as having the capability of hydrolyzing raffinose, stachyose, and verbascose.

The oligosaccharides can also be hydrolyzed by chemical means. In addition to inorganic acids such as hydrochloric, some organic acids also have this capability. Matumoto in *J. Chem. Soc. Japan*, 60, 1939, pp. 1127-48, found that sucrose, raffinose, and stachyose present in the Satsuma orange are easily hydrolyzed by citric acid at a pH of 1.7.

Certain enzyme systems have been used with considerable success to reduce the alpha oligosaccharide content of legumes. Sherba, et al, in U.S. Pat. No. 3,632,346, Ciba Geigy in French Pat. No. 2,137,548, and Sugimoto, et al, in *J. Food Sci.* 35, 5, 1970, pp. 655-60, have employed carbohydrate enzymes obtained from fungal yeast and bacterial organisms for hydrolysis. It has also been found that legumes themselves contain an alpha galactosidase, and in U.S. Pat. No. 3,876,807 of Wagner, et al, an autolysis process was employed wherein beans were held at 45° to 55° C. for 24 to 48 hours at a pH of 5 to 5.5. By this process the content of stachyose, raffinose, and phytic acid was greatly reduced.

Another approach to reducing the alpha oligosaccharide content of legumes had been extraction. Ethanol has been used. Also, by extensive blanching and soaking with water, and discarding the soak water prior to cooking, the alpha galactosides can be substantially removed, according to A. C. Olsen reporting at the *ACS Symposium on Anti-Nutrients and Natural Toxicants in Foods,* April 1979.

These simple and logical solutions have not been proven effective, upon testing. Calloway, et al., report in *J. Food Sci.*, 36, 1971, pp. 251-5, on experiments in which various legumes were fed to humans and the quantity of flatus measured. It was found that some reduction in flatus occurred by enzyme treatment and by alcohol extraction, but that flatus was by no means completely eliminated. Products such as tempeh and tofu, from which nearly all carbohydrates have been removed, were found to be essentially non-flatulent.

The foregoing shows that heretofore no method of treatment has proved completely successful in eliminating flatulence and associated indigestibility from beans without removing nearly all of the carbohydrates present. Thus, there is a loss of a potentially nutritious component. Moreover, some of the methods that have been attempted require grinding the beans in the treatment process. Any method or formulation for solving the flatulation problem must not disturb other consumer-accepted bean properties. Such a method or formulation must not alter the texture of the final product. It must avoid emphasizing harsh bitter "off-flavors" inherently present in beans. Finally, to be commercially viable, it must neither significantly increase processing costs nor raw material expense of the final bean products. The present process and formulation meets these objectives.

Legumes pose additional difficulties as well which limit their usefulness. For example, conventional processing of legumes requires that beans be soaked prior to cooking. The soak water leaches out nutrient value from the beans. This nutritional value is routinely discarded because the soak liquid lends a bitter "off" taste to the final product if the legumes are cooked in the soak liquid. Also, with many cooked bean products, it is desirable to present associated sauce or other interstitial fluid having a rich thick consistency. Many legumes, especially soybeans, fail to provide the desired thick sauce with conventional cooking methods. The present invention solves these problems as well.

The present invention employs neutralized enzyme systems found in certain pineapple or papaya materials. Several common cookbooks (for example, *Joy of Cooking,* Rombaner et al., 1971, p. 261) disclose the addition of normally edible pineapple components—chunks, crushed and slices—to baked bean dishes as garnishes or flavoring components. At no point do these teachings suggest the present deflatulation or comestibility improvement findings nor the use of the present neutralized enzyme systems.

STATEMENT OF THE INVENTION

It has now been found that legumes of the genus Phaseolus, genus Soja and genus Lens are deflatulated and the comestibility and consistency of edible products containing them are improved by admixing with said legumes before cooking an effective amount of neutralized enzyme system present in or isolated from portions (preferably inedible portions) of the plants and/or fruits of pineapple or papaya. In one aspect, this invention relates to the process for deflatulating and improving the comestibility and consistency of these legumes. In a second aspect, this invention relates to the improved legume product which results.

DETAILED DESCRIPTION OF THE INVENTION

Definitions

In this patent application, these terms shall have the following meanings:

Juice—Pineapple juice normally consumed as an edible product.

Fruit—That portion of the tissue of a papaya or pineapple that is normally consumed as a solid edible product.

Peels and cores—The peels, cores, table trimmings, and other pineapple tissue processing residues that are normally considered inedible. These may have been mechanically pressed to recover additional juice. They may have been dried or may be undried. In dried form this material is commonly called Pineapple Bran.

Press juice—Fluids obtained by mechanically pressing peels and cores.

Syrup—Press juice that has been concentrated by evaporation or other means. It may or may not have been deionized prior to concentration.

Extract—Solutions that have been extracted by water from peels and cores whether the latter have been pressed or are unpressed. The extract may have been concentrated to a syrup and may or may not have been deionized prior to concentration.

Not normally consumed components—Peels and cores, press juice syrup not treated to the extent to be suitable for comingling with fruits or beverages, and extract of pineapple peels and cores as well as latexes from papaya melon, leaves and trunks. "Normally consumed" is in reference to human consumption.

Enzyme system—The combination of enzymes present in a not normally consumed component. If the term is modified by the word "neutral" or "neutralized", the enzyme system or the cooking mixture containing the enzyme system has been brought to a pH of about 7 or greater (e.g., pH 7-11) by the addition of a comestibly acceptable base such as an alkali metal hydroxide or bicarbonate, for example, sodium hydroxide or sodium bicarbonate.

THE ENZYME SYSTEM EMPLOYED

The enzyme system employed in this invention is a neutral enzyme system that may be selected from enzyme systems present in not normally consumed components of pineapple and papaya plants and neutralized. These systems may be employed as isolated systems and may be so obtained such as the commercially available Bromelain 1200 of Dole Chemical Company (isolated from pineapple stem juice, and/or peels and cores) or Panol ® of Enzyco (isolated from latexes of papaya melon, leaves and trunks). These systems may also be employed as the not normally consumed components of pineapple and papaya, themselves, particularly pineapple bran or extracts.

The isolated systems, such as Bromelain 1200 and Panol ® are known as proteases and one of their principal uses is for tenderizing meats. The action of Bromelain 1200 is stated to be specific and to attack only specific bonds in protein materials.

Though the compounds bromelin and papain are though to be the principal components of Bromelain 1200 and Panol ®, respectively, both of these commercial preparations are actually enzyme systems. Bromelain 1200 is a mixture of proteases and also contains enzymes such as acid phosphotase, peroxidase, amylase, and pectinesterase. Heinicke in U.S. Pat. No. 3,293,143 mentions an even greater variety of non-proteases as having been isolated from pineapple stem juice, from which Bromelain 1200 is prepared. Panol ® has a similar mixed character.

A number of processes have been patented (or described in the technical literature) for the production of isolated bromelin- or papain-containing enzyme systems. They all involve precipitation of the enzyme system with an inorganic salt (usually ammonium sulfate) or with a lower aliphatic alcohol or ketone, or both (e.g., Wilson, U.S. Pat. No. 3,817,834, *Chemical Technology: An Encyclopedic Treatment* (Volume V), Barnes and Noble, New York, 1972). The product may vary in subsequent processing purity (e.g., ash content), yield, and so forth. However, they should all contain the same group of enzymes and should all behave in the same manner functionally. Thus, the scope of this discovery is not limited to the two aforementioned isolated enzyme systems but includes generally the enzyme systems isolated from and present in the not normally consumed components of pineapple and papaya plants.

THE LEGUMES TREATED

The legumes beneficially treated in accord with this invention include the seeds of the genus Phaseolus, genus Soja, and genus Lens, both as the seeds (beans) themselves and as products made therefrom. These legumes include many prominent food materials, for example, the beans known as the "common beans" such as large white beans, California small white beans, pinto beans, red beans, black beans, calico beans, red Mexican beans, brown beans, bayo beans, and soybeans.

The neutral enzyme system addition is especially effective in improving taste and acceptability of beans of the genus Soja. Soy bean flour is used in a number of food products, but the concentrations employed are limited in part because of flavor considerations. The flatulence resulting from the ingestion of the carbohydrate content of these flours is a further deterrent to their use.

Because of their objectionable flavor, human consumption of whole soy beans is very limited. Furthermore, when cooked in the same manner and with the same kind and quantity of sauce ingredients added as are used in the processing of white beans, the interstitial liquid associated with the cooked soybeans is very thin and unappealing.

The process of this invention provides a means by which high proportions of whole soy beans can be incorporated in formulations that are both highly palatable and of pleasing appearance. In this preferred embodiment, beans of the genus Phaseolus are mixed with the beans of the genus Soja in the following ratios $$\frac{\text{Phaseolus wt}}{\text{Soja wt}} = \frac{10}{1} \text{ to } \frac{1}{6} \text{ and preferably } \frac{4}{1} \text{ to } \frac{1}{4}.$$

This embodiment is more preferably embodied when the Phaseolus bean is a common white bean and the Soja bean is the soy bean. At these ratios the present treatment improves the products's taste and consistency and deflatulates it.

TREATMENT CONDITIONS

Addition of the neutral enzyme systems in accord with this invention can improve the taste profile and yield of conventional bean products. Commercially canned white beans are prepared with sauces containing ingredients such as molasses, brown and white sugar, mustard, onions, and many other seasoning components. With brands containing highly flavored sauces, the addition of the enzyme systems of this invention may not noticeably affect the flavor one way or another. However, with one brand that contains a lightly flavored sauce, a taste panel was completely in concurrence that there was a distinct improvement in the flavor by the addition of the enzyme system.

The neutral enzyme systems should be added to the beans before cooking. While little or no difference in deflatulation effectiveness is noted when the enzyme is added to the initial bean soaking water without discarding the soaking water before cooking, to the bean cooking water after the soaking water is discarded, or the final bean product in its ready-to-eat form, addition before cooking is desirable to obtain the desired yield and consistency improvements. The addition is effected by art-known mixing procedures such as by dispersing or dissolving the enzyme system or enzyme-containing plant material or component in the bean processing liquid, with the bean cooking liquid, or in the final bean-containing comestible product. If dried peels and cores are employed, they should be in a finely divided form, such as not coarser than about 15 mesh. Such a form is dispersible throughout the final bean product, and permits the enzyme to contact the beans.

The soaking time for uncooked beans is not critical, but of course, should be long enough so that the beans are fully rehydrated. The soaking liquid can be used as cooking water. Such use is preferred. The cooking time and temperature need only be sufficient to render the beans tender. In commercial canning, the temperature is normally about 250° F.

Enzyme concentration—In the case of isolated systems, this is expressed as grams of total enzyme system per gram of total carbohydrate in the legume treated. In the case of plant components, this is expressed as total soluble solids in the plant component per gram of total carbohydrate in the dried legume treated. Among those specified, the total carbohydrate content varies from about 33% to 62% of the dried bean weight.

In general, the minimum neutralized enzyme concentrations I prefer are 0.005 for isolated systems such as Panol ® or Bromelain 1200. For plant components such as peels, bran, and the like, the minumum concentration preferred is 0.025.

Maximum levels of enzyme system concentration are not definite and can be incorporated in substantial excesses beyond the minimum effect level. Excess concentrations may be used to ensure that notwithstanding errors of measurement an adequate amount is present in each container or batch or for other purposes as described subsequently. Such excesses can be 5, 10 or even 20 times these minimums.

Addition of the neutralized enzyme systems of the invention at concentration levels sufficient to prevent flatulence will increase the consistency of the interstitial liquid or the total yield of cooked beans if the interstitial liquid is diluted with water. For some purposes, however, it may be desired to further increase the consistency or yield by further addition of the enzyme system. With white beans in the genus Phaseolus, the practical maximum that can be attained in terms of yield ranges from about 22 to 32 percent increase over that with no enzyme addition. To achieve this maximum, the following are the concentrations of the various neutral enzyme systems employed that should be used.

|  | Enzyme Concentration | | |
| --- | --- | --- | --- |
| Enzyme System | Useful | Most Preferred | Preferred |
| Peels and cores | 0.1–1.0 | 0.5 | 0.3–0.8 |
| Extracts | 0.1–1.0 | 0.5 | 0.3–0.8 |
| Syrup | 0.3–1.2 | 0.6 | 0.4–1.0 |
| *Juice and fruit | 0.4–2.0 | 1.2 | 0.6–1.5 |
| Isolated enzyme systems | 0.01–0.15 | 0.04 | 0.02–0.08 |

*As can be seen neutralized edible components can work as well but are less effective on a weight basis.

In mixtures of white beans and soy beans the flavor will improve and the interstitial liquid in the cooked beans will have a thicker consistency for a given enzyme concentration, the higher the proportion of white beans in the mixture. Conversely, the higher proportion of soybeans in the mixture, the greater the neutral enzyme concentration necessary to achieve an interstitial liquid of suitable consistency. Following are the usual minimum proportions of white beans preferred to achieve an interstitial liquid with approximately the same consistency as that in commercially canned white beans, and the corresponding enzyme concentrations necessary to be employed. In this instance, the enzyme concentrations are expressed in terms of grams of soluble solids per gram of white bean carbohydrate.

| Enzyme System | Enzyme Concentration Most Preferred | Minimum White Bean Proportion, % by wt. |
| --- | --- | --- |
| Peels and cores | 0.6 (0.5–0.7) | 20 |
| Extract | 0.85 (0.7–1.0) | 20 |
| Syrup | 1.1 (0.9–1.3) | 20 |
| *Juice and fruit | 1.5 (1.3–1.7) | 25 |
| Isolated enzyme systems | 0.05 (0.03–0.08) | 67 |

*As can be seen neutralized edible components can work almost as well but are less effective on a weight basis.

These proportions and concentrations are exemplary and may be varied as desired. In all cases, the enzyme system should be neutral, as that term is herein defined.

Other thickening agents, such as cornstarch, may be added to either mixtures of white beans and soybeans or soybeans alone, along with the enzyme system. The concentration of the enzyme system may be reduced by the addition of the non-enzyme thickening agent to a level sufficient only to accomplish deflatulation and flavor improvement. However, the enzyme system should always be neutral so as to take advantage of the thickening power of the white bean component.

The invention is illustrated by the following examples. These are provided solely to exemplify the invention and are not to be construed as limiting its scope.

EXAMPLE 1

To 80.7 grams of commercially canned pork and beans in a tomato sauce were added 3.6 grams of dried pineapple peel and 14.5 grams of water for rehydration of the peel. After mixing and rehydration, the ground peel particles appeared as small brown flakes similar to pepper. This mixture was warmed and its taste compared with similarly warmed untreated beans of the same brand. The flavor of the treated beans was definitely superior to that of the untreated beans.

EXAMPLE 2

A series of samples of California small white beans was prepared in which the beans were soaked in a mixture of distilled water and neutralized pineapple juice for a period of 16 hours. The amount of distilled water added was such that after cooking the interstitial liquid just covered the volume of the cooked seeds. After cooking for one hour at a pressure of 15 psi, the following results were obtained.

| Enzyme Added | Relative Cooked Weight |
| --- | --- |
| 0 | 1.00 |
| 0.091 | 1.044 |
| 1.104 | 1.249 |

Had sufficient water not been added to the sample with the enzyme addition, the interstitial liquid after cooking would not have covered the bean seeds and would have been unpourable at room temperature.

EXAMPLE 3

Kidney beans were soaked in distilled water to which pineapple juice neutralized with sodium hydroxide was added. The proportion of juice was 1.76 grams per gram of dry beans. After 16 hours soaking, flavoring ingredients were added and the mixture was cooked for one hour at a pressure of 15 psi. Consumption of 164 grams of the product resulted in only very slight flatulence.

EXAMPLE 4

Whole soybeans were treated and cooked in the same manner as Example 3, except that the proportion of juice was 2.03 grams per gram of dry beans. Consumption of 174 grams of the product resulted in no flatulence or other adverse effects.

EXAMPLE 5

The soybeans prepared as described in Example 4 were quite palatable but had a stronger flavor than white beans cooked under the same conditions. However, the sauce was so thin that it had to be eaten with a spoon.

The palatability of the soybeans treated by the method of this invention is in sharp contrast to the results report by Calloway, et al. in *J. Food Sci.*, 36, 1971, pp. 251-5. In the Calloway investigation soybeans were treated with the enzyme Diastase 80. The treated soybeans were extremely unpalatable and "defied all attempts at flavor enhancement."

EXAMPLE 6

Equal parts of soybeans and California small white beans were soaked in a mixture of distilled water and neutral syrup. The enzyme concentration was 0.212 based on the carbohydrate content of the white bean component. The period of soaking was 16 hours. Without changing the soaking mixture, the sauce ingredients used in the preparation of white beans were added and the mixture cooked for one hour at 15 psi.

The cooked beans had an excellent flavor, almost indistinguishable from those of a smilarly prepared sample composed entirely of white beans. The sauce was of a moderately thick consistency similar to that in a number of commercially canned white beans.

EXAMPLE 7

Lentils were cooked with neutral pineapple juice at an enzyme concentration of 0.66. The ratio of cooked bean weight to dry bean weight was 5.35. Without enzyme addition but otherwise cooked under the same conditions, the ratio was only 4.41.

From the foregoing it is apparent that the use of neutral enzyme systems of the present invention can enhance the flavor of commercial white bean preparations and can increase the cooked bean yield. Further, they provide a means by which nutritious and relatively inexpensive soybeans can be incorporated in human food formulations with a high degree of palatability and visual appeal.

What is claimed is:

1. A process for improving the comestibility, and yield of an edible comprising a legume selected from the group consisting of legumes of the genus Phaseolus, the genus Soja, and the genus Lens which comprises admixing with said legume before cooking an effective comestibility and yield improving amount of a neutralized bromelin-containing enzyme system or a neutralized papain-containing enzyme system.

2. The process of claim 1 wherein said enzyme system is an isolated enzyme system.

3. The process of claim 2 wherein said isolated enzyme system is a bromelin-containing enzyme system.

4. The process of claim 2 wherein said effective amount is from 0.005 to 0.150 grams of enzyme system per gram of carbohydrate present in said legume.

5. The process of claim 4 wherein said legume is a common bean of the genus Phaseolus.

6. The process of claim 4 wherein said legume is whole or defatted soybeans.

7. The process of claim 4 wherein said legume is a mixture of legumes of the genus Soja and of the genus Phaseolus.

8. The process of claim 1 wherein said enzyme system is contained in a neutralized not normally consumed plant component.

9. The process of claim 8 wherein said effective amount is from 0.1 to 1.0 grams of soluble solids in said plant component per gram of carbohydrate in said legume.

10. The process of claim 9 wherein said legumes comprise a mixture of legumes of the genus Soja and of the genus Phaseolus.

11. An edible product characterized as being non-flatulent and as having improved comestibility and interstitial fluid consistency and comprising beans selected from the group consisting of common beans including whole or defatted soybeans cooked in admixture with an effective flatulence preventing and comesbility and interstitial fluid consistency improving amount of a neutralized bromelin or papain-containing enzyme system.

12. The edible product of claim 11 wherein said enzyme system is a papain-containing enzyme system.

13. The edible product of claim 11 wherein said enzyme system is a bromelin-containing enzyme system.

14. The edible product of claim 13 wherein said enzyme system is present as an isolated system and said effective amount is from 0.005 to 0.20 grams of enzyme system per gram of carbohydrate in said beans.

15. The edible product of claim 13 wherein said neutralized enzyme system is present as a not normally consumed pineapple component selected from neutralized pineapple bran, neutralized press juice and neutralized extract from pineapple peels and cores and said effective amount is from 0.05 to 1.2 grams of soluble solids in the component per gram of carbohydrate in said beans.

16. The edible product of claim 13 additionally comprising a non-enzyme thickening agent.

17. A process for deflatulating and increasing the comestibility and yield of an edible comprising common beans of the genus Phaseolus which comprises adding to said edible before cooking neutralized pineapple bran, neutralized press juice or neutralized extract from peels and cores in an amount of from 0.05 to 1.0 grams soluble solids per gram of total carbohydrate present in said beans.

18. An edible common bean-containing product characterized as being nonflatulent and as having improved comestibility and yield and comprising common beans that have been cooked in admixture with neutralized pineapple bran, neutralized press juice or neutralized extract from peels and cores in an amount of from 0.5 to 1.2 grams of said pineapple bran or extract per gram of total carbohydrate in said beans.

19. The product of claim 18 wherein said common beans comprise a mixture of soybeans and white beans.

* * * * *